US011183055B2

(12) United States Patent
Zhang et al.

(10) Patent No.: US 11,183,055 B2
(45) Date of Patent: Nov. 23, 2021

(54) METHODS AND SYSTEMS FOR CLASSIFYING A SPEED SIGN

(71) Applicant: HERE Global B.V., Eindhoven (NL)

(72) Inventors: Zhenhua Zhang, Chicago, IL (US); Leon Stenneth, Chicago, IL (US); Sarah Fatima, Hoffman Estates, IL (US); Preeti Sharma, Mumbai (IN)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/817,229

(22) Filed: Mar. 12, 2020

(65) Prior Publication Data

US 2021/0287538 A1 Sep. 16, 2021

(51) Int. Cl.
*G08G 1/0962* (2006.01)
*G06K 9/00* (2006.01)

(52) U.S. Cl.
CPC ..... *G08G 1/09623* (2013.01); *G06K 9/00818* (2013.01)

(58) Field of Classification Search
CPC ............ G08G 1/09623; G06K 9/00818
USPC ............................................ 340/905
See application file for complete search history.

(56) References Cited

U.S. PATENT DOCUMENTS

| | | | |
|---|---|---|---|
| 8,346,706 B2 | 1/2013 | Groitzsch et al. | |
| 8,995,723 B2 * | 3/2015 | Stein | G08G 1/0967 382/104 |
| 9,056,395 B1 * | 6/2015 | Ferguson | B60W 30/16 |
| 9,436,879 B2 * | 9/2016 | Zobel | G08G 1/09623 |
| 9,626,865 B2 | 4/2017 | Yokochi et al. | |
| 9,697,430 B2 * | 7/2017 | Kristensen | G06K 9/3241 |
| 10,282,985 B2 | 5/2019 | Bjersing | |
| 10,657,394 B2 * | 5/2020 | Stenneth | G06K 9/00818 |
| 2017/0161567 A1 | 6/2017 | Satomura | |
| 2020/0184812 A1 * | 6/2020 | Han | B60R 1/00 |
| 2020/0234587 A1 * | 7/2020 | Girond | B60R 1/00 |

FOREIGN PATENT DOCUMENTS

KR 20170129466 * 11/2017 ............. G08G 1/01

* cited by examiner

*Primary Examiner* — John A Tweel, Jr.

(74) *Attorney, Agent, or Firm* — Ditthavong, Steiner & Mlotkowski

(57) ABSTRACT

A system, method and computer program product are provided for classifying at least one speed sign associated with a region. In an example embodiment, the method may include obtaining sensor data comprising speed limit data associated with the at least one speed sign. The method may further include obtaining map data associated with a segment of the region, wherein the map data comprises conditional speed limit data associated with a conditional speed limit sign linked with the segment. The method may further include comparing the speed limit data with the conditional speed limit data and classifying the at least one speed sign as one of a conditional speed sign or a non-conditional speed sign based on the comparison.

16 Claims, 9 Drawing Sheets

METHODS AND SYSTEMS FOR CLASSIFYING A SPEED SIGN

TECHNOLOGICAL FIELD

The present disclosure generally relates to routing and navigation, and more particularly relates to classify at least one speed sign associated with a region.

BACKGROUND

Various navigation applications are available to provide assistance, for example directions for driving, walking, or other modes of travel. Web-based systems and mobile app-based systems offer navigation applications that allow a user to request directions from one point to another. Quite often, a vehicle receiving navigation assistance has to traverse a conditional segment such as a conditional road, a conditional railway track or the like, having conditional speed signs as a part of the route between a source and a destination location. For example, the conditional segment corresponds, but not limited to, a road under construction, a railway track under construction, a road having high traffic at specific time of a day, a priority railway track, a road having specific speed limit during few hours of the day (like during certain night hours), segments associated with different speeds for specific weather conditions (e.g. when wet or raining or fog) such as cloudy air traffic lane, and the like. In order to enter and exit such conditional segments, the vehicle should be accurately informed about the exact speed to be followed and conditions on such segments. More importantly, in the context of autonomous vehicles, it is of utmost importance that the navigation assistance provides correct speed sign information along with the condition on the conditional segments. To this end, the map data utilized for the navigation assistance should provide conditional speed information for the respective segment. Current solutions may not provide conditional information associated with the segments while providing the navigation assistance.

BRIEF SUMMARY

Accordingly, there is a need for providing one or more conditions associated with a conditional segment of a region, based on conditional speed signs. Example embodiments of the present disclosure provide a system, a method, and a computer program product for classifying at least one speed sign associated with the segment of the region.

Some example embodiments disclosed herein provide a system for classifying at least one speed sign associated with a region. The system comprises a memory configured to store computer-executable instructions and one or more processors configured to execute the instructions to obtain sensor data comprising speed limit data associated with the at least one speed sign. The one or more processors are further configured to obtain map data associated with a segment of the region. The map data comprises conditional speed limit data associated with a conditional speed limit sign (hereinafter also referred as conditional speed sign) linked with the segment. The one or more processors are further configured to compare the speed limit data with the conditional speed limit data. The one or more processors are further configured to classify the at least one speed sign as one of a conditional speed sign or a non-conditional speed sign based on the comparison.

According to some example embodiments, the sensor data is obtained from one or more sensors associated with a vehicle traversing the segment.

According to some example embodiments, the one or more processors are further configured to update the map data associated with the segment based on the classification of the at least one speed sign.

According to some example embodiments, the one or more processors are further configured to determine a presence of a plurality of speed signs within a proximity distance threshold and select a speed sign with maximum speed value among the plurality of speed signs as the at least one speed sign.

According to some example embodiments, the one or more processors are further configured to determine a presence of a plurality of speed signs within a proximity distance threshold and select a speed sign with minimum speed value among the plurality of speed signs as the at least one speed sign.

According to some example embodiments, the one or more processors are further configured to determine a presence of an end of all restriction sign and a speed limit start sign within a proximity distance threshold and select the end of all restriction sign and discard the speed limit start sign.

According to some example embodiments, the one or more processors are further configured to determine a presence of a speed limit end sign and a speed limit start sign within a proximity distance threshold, and select the speed limit start sign and discard the speed limit end sign.

According to some example embodiments, the conditional speed limit sign comprises a conditional speed value limit, and a condition for which the conditional speed value limit is applicable.

According to some example embodiments, the at least one speed sign is classified as the conditional speed sign based on at least one of a difference in a location of the at least one speed limit sign and a location of the conditional speed limit sign is less than a threshold value or a speed value of the at least one speed limit sign is equal to a speed value of the conditional speed limit sign.

According to some example embodiments, the location of the conditional speed limit sign corresponds to a link start location of a link associated with the segment.

In some example embodiments, a method may be provided for classifying at least one speed sign associated with a region. The method comprises obtaining sensor data comprising speed limit data associated with the at least one speed sign. The method may include obtaining map data associated with a segment of the region. The map data comprises conditional speed limit data associated with a conditional speed limit sign linked with the segment. The method may further include comparing the speed limit data with the conditional speed limit data. The method may further include classifying the at least one speed sign as one of a conditional speed sign or a non-conditional speed sign based on the comparison.

Some example embodiments disclosed herein may provide a computer programmable product comprising a non-transitory computer readable medium having stored thereon computer executable instruction which when executed by one or more processors, cause the one or more processors to carry out operations for classifying at least one speed sign associated with a region, the operations comprising obtaining sensor data comprising speed limit data associated with the at least one speed sign. The operations further comprise obtaining map data associated with a segment of the region. The map data comprises conditional speed limit data associated with a conditional speed limit sign linked with the segment. The operations further comprise comparing the speed limit data with the conditional speed limit data. The operations further comprise classifying the at least one speed sign as one of a conditional speed sign or a non-conditional speed sign based on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
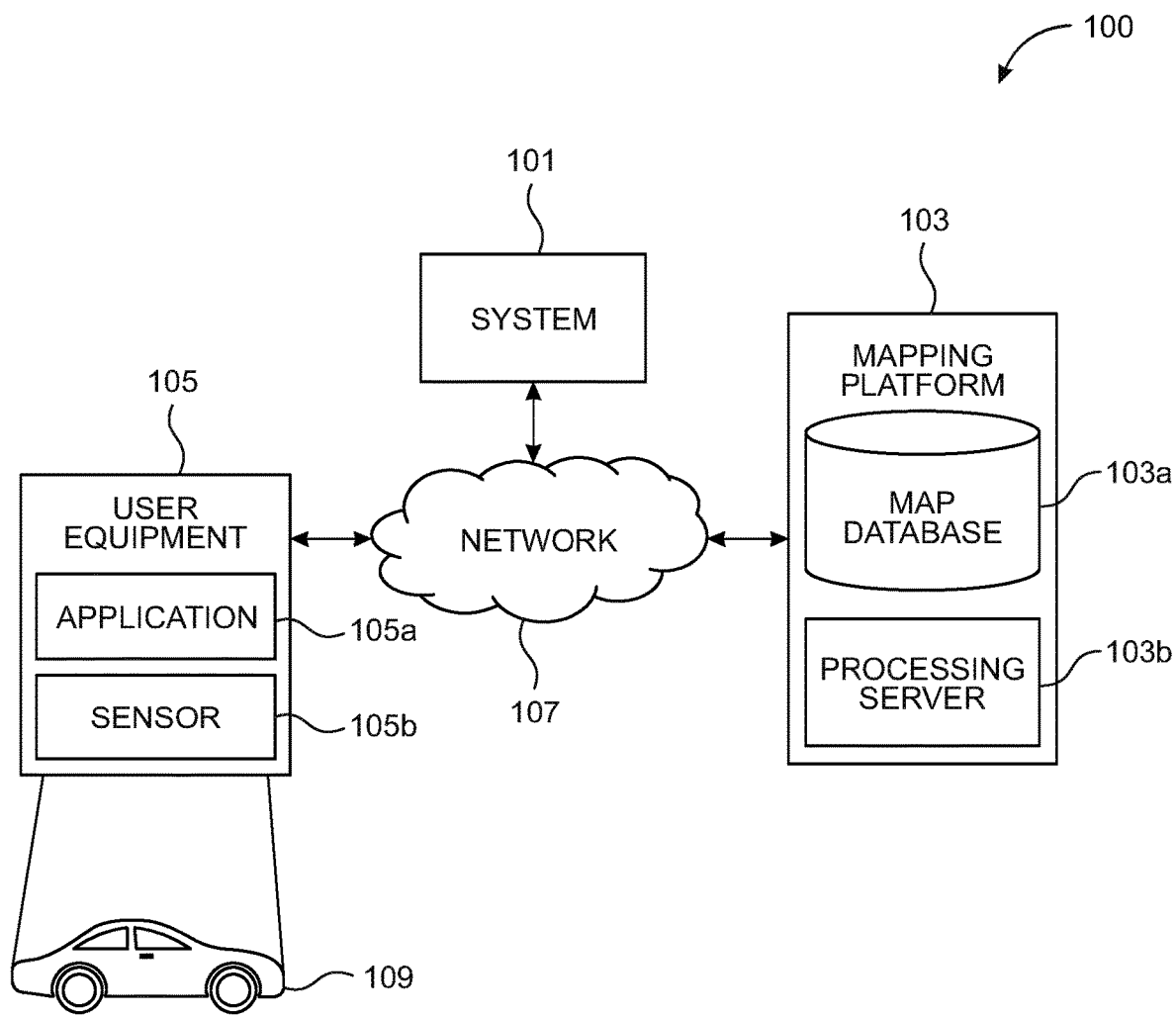
Figure 2:
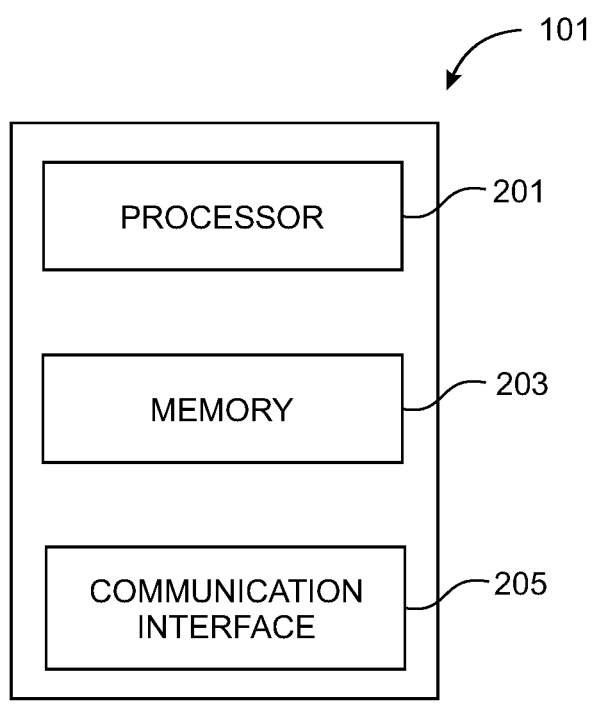
Figure 3:
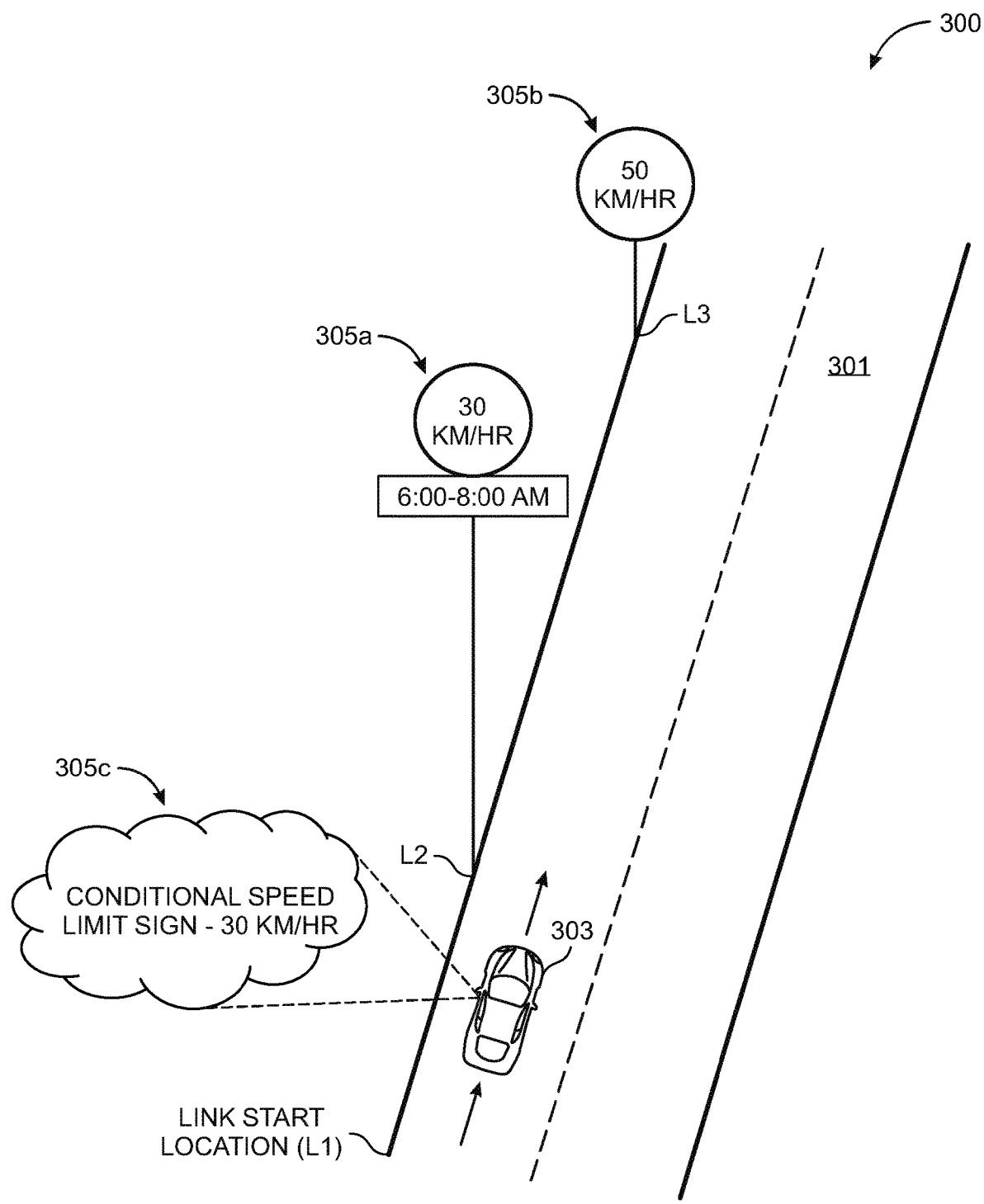
Figure 4:
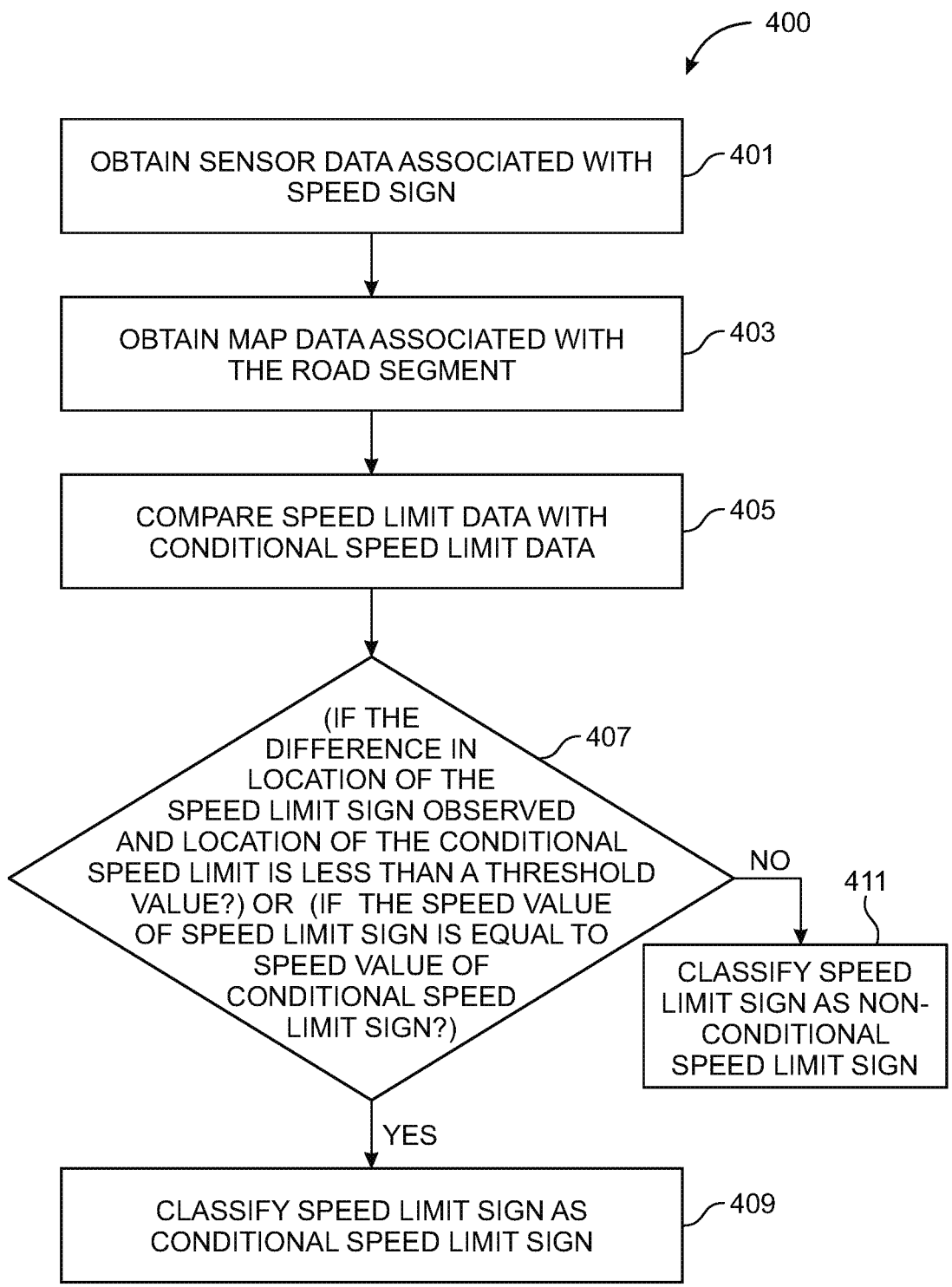
Figure 5A:
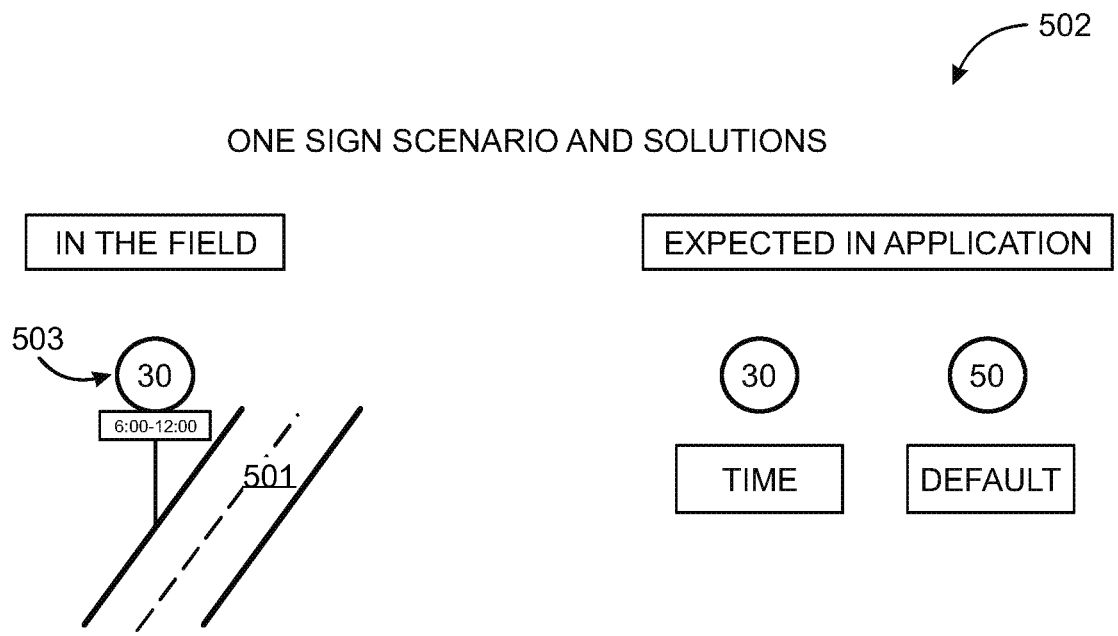
Figure 5B:
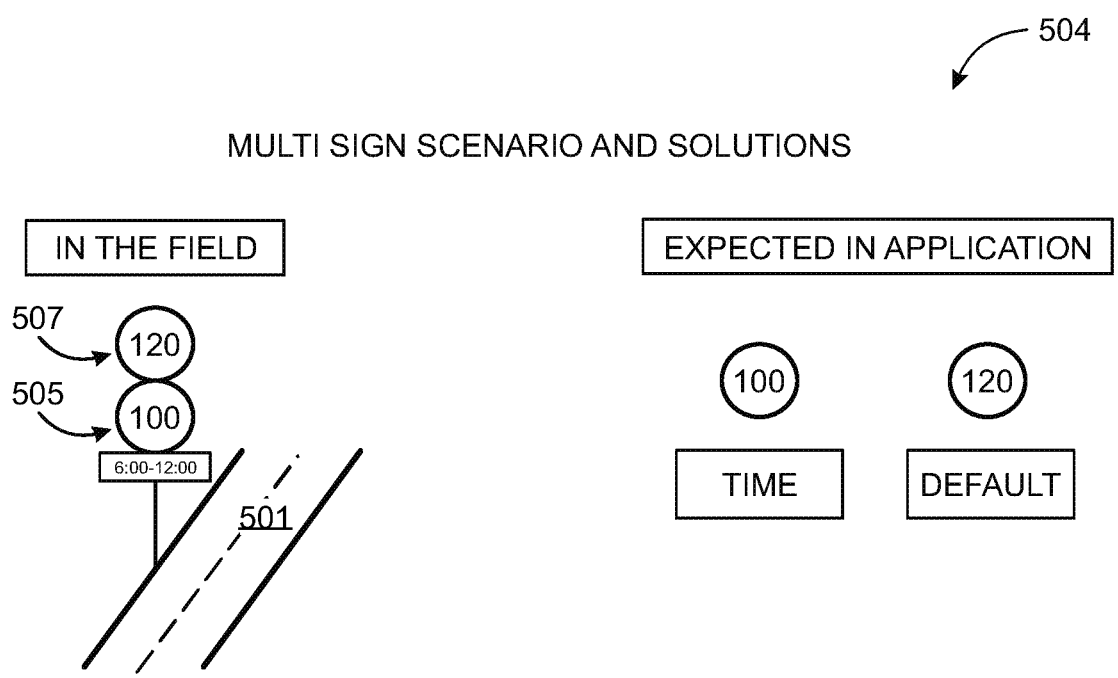
Figure 5C:
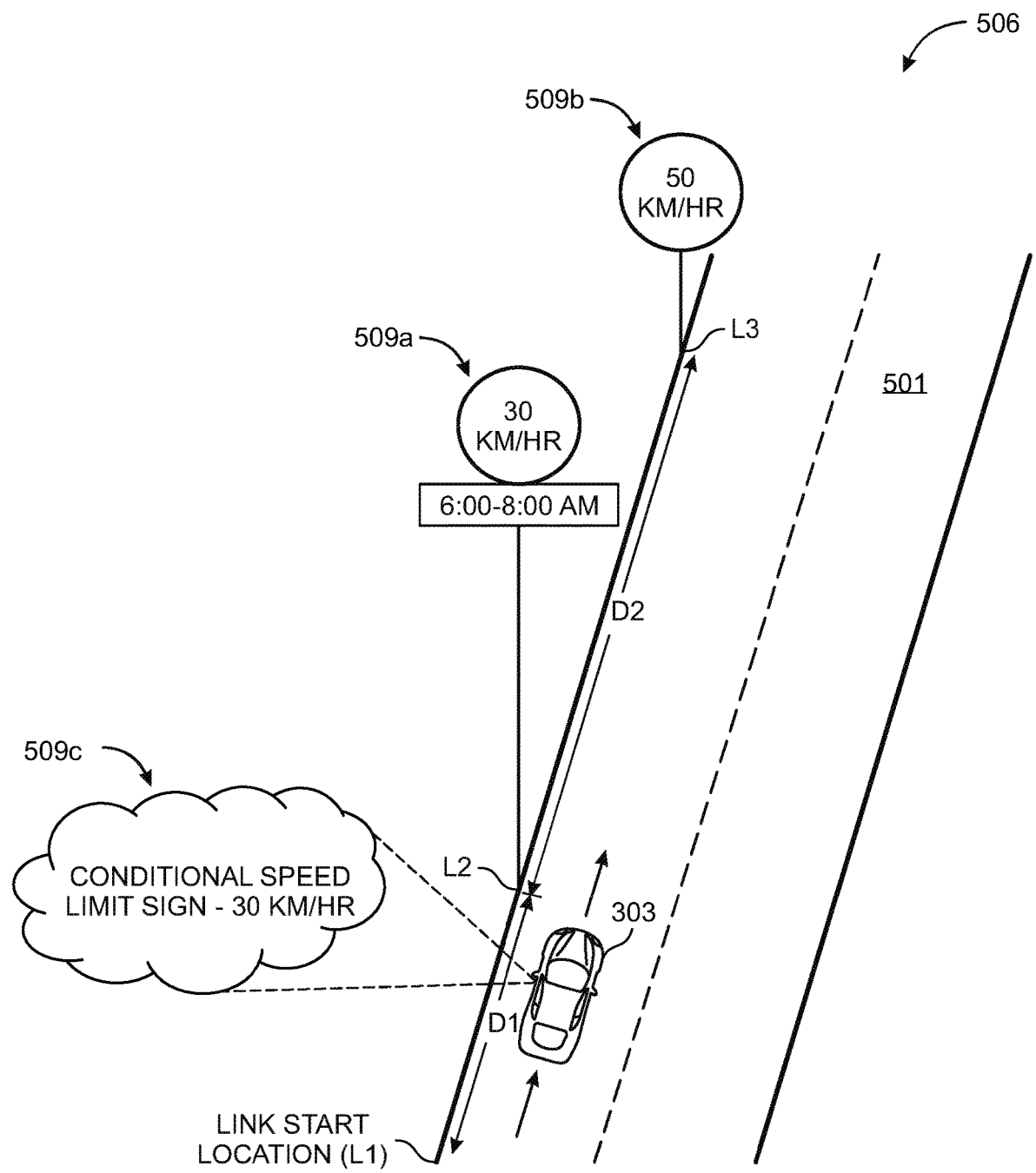
Figure 5D:
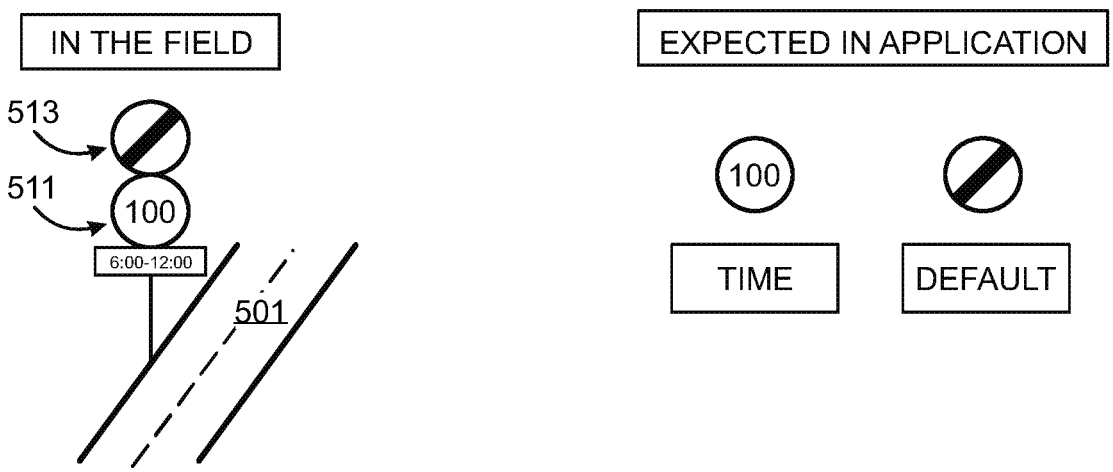
Figure 5E:
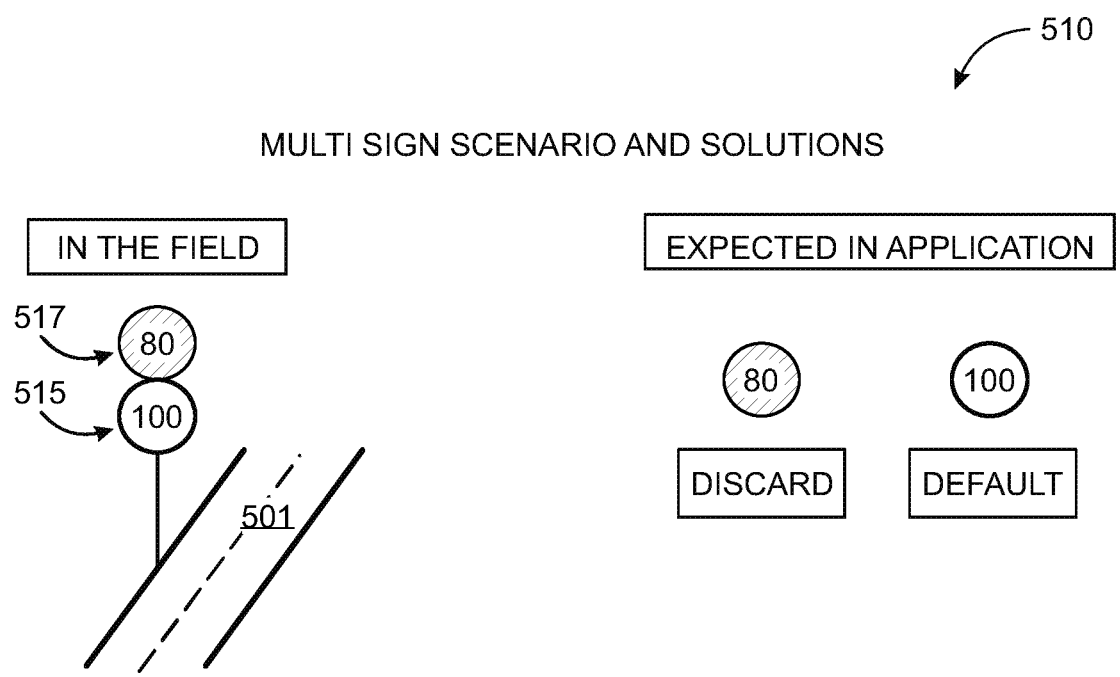
Figure 6:
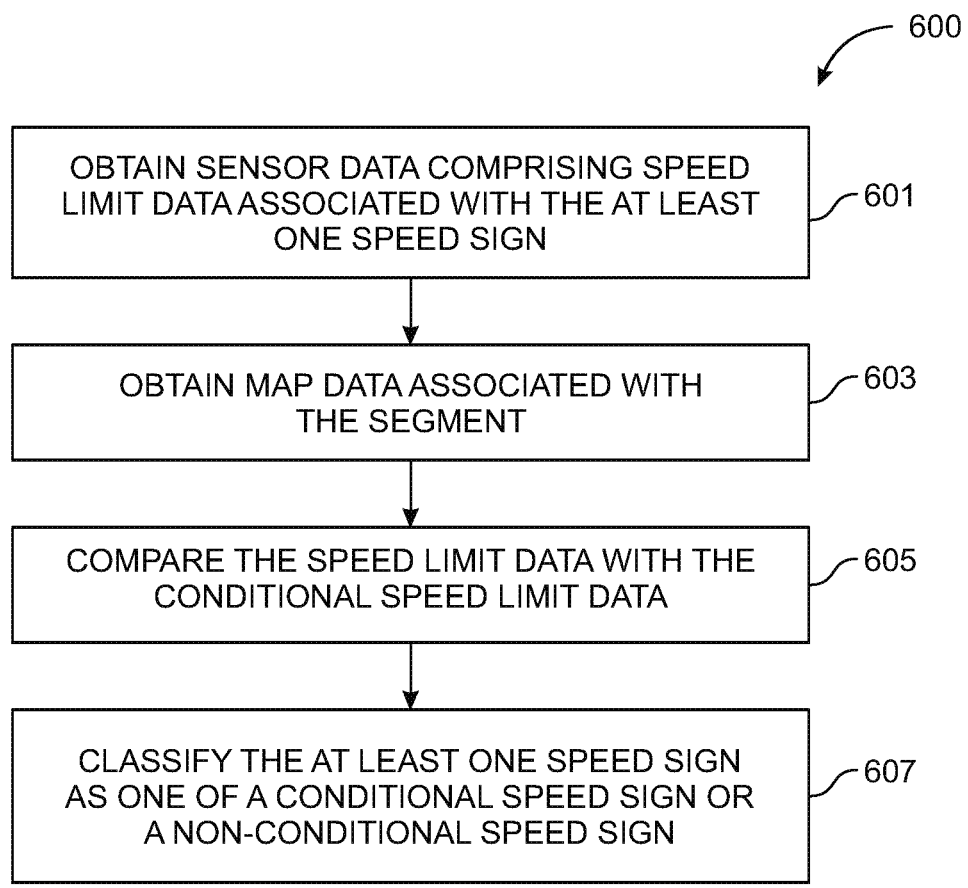

Having thus described example embodiments of the invention in general terms, reference will now be made to the accompanying drawings, which are not necessarily drawn to scale, and wherein:

FIG. 1 illustrates a schematic diagram of a network environment of a system for classifying at least one speed sign associated with a road segment, in accordance with an example embodiment;

FIG. 2 illustrates a block diagram of the system, exemplarily illustrated in FIG. 1, for classifying at least one speed sign associated with a road segment, in accordance with an example embodiment;

FIG. 3 illustrates an exemplary scenario depicting a problem in classifying at least one speed sign associated with the road segment, in accordance with an example embodiment;

FIG. 4 illustrates a flow diagram of a method for classifying a speed limit sign as conditional or non-conditional speed sign, in accordance with an example embodiment;

FIG. 5A illustrates an exemplary scenario of capturing and processing of single sensor data, in accordance with an example embodiment;

FIG. 5B illustrates an exemplary scenario of capturing and processing of multiple sensor data, in accordance with an example embodiment;

FIG. 5C illustrates an exemplary scenario for classification of a speed limit sign as a conditional speed limit sign, in accordance with an example embodiment;

FIG. 5D illustrates an exemplary scenario of capturing and processing of an end of all restriction sign present in proximity with a speed limit start sign, in accordance with an example embodiment;

FIG. 5E illustrates an exemplary scenario of capturing and processing of a speed limit end sign present in proximity of a speed limit start sign, in accordance with an example embodiment; and FIG. 6 illustrates a flow diagram of a method for classifying at least one speed sign associated with a road segment, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading a traveler from one location to another. The road may have a single lane or multiple lanes.

The term "link" may refer to any connecting pathway including but not limited to a roadway, a highway, a freeway, an expressway, a lane, a street path, a road, an alley, a controlled access roadway, a free access roadway and the like. The link may correspond to a segment of a region such as a road segment, a railway track segment, an air traffic lane segment or the like. The link is interchangeably referred as "segment" or "road segment" throughout the description.

The term "single digitized link" may refer to a link which includes all lanes in both driving directions.

The term "multi-digitized link" may refer to link which includes lanes in single driving direction.

The term "reference node" may refer to a lower left node of the link and other nodes are called as "non-reference nodes".

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles. The vehicle may correspond to land vehicles such as cars, trucks, trains etc., air vehicles such as drone, airplanes, etc., or water vehicles such as motorboats, ships, etc.

The term "conditional speed sign" may refer to any road sign or speed sign associated with one or more conditions.

End of Definitions

Embodiments of the present disclosure may provide a system, a method and a computer program product for classifying at least one speed sign associated with a segment of a region. To this end, the at least one speed sign associated with the segment is classified as a conditional speed sign or a non-conditional speed sign. In one or more example embodiments, the classified speed sign may be used for updating the map data associated with the segment. The region may correspond to at least one of a land region such as road, railway tracks etc., an air region such as air traffic lanes for drones, or water region. The segment may correspond to a link which may comprise at least one of a road segment, a railway track segment, a virtual air traffic lane segment or the like. The system, method, and computer program product disclosed herein may provide accurate link condition from the map data fused with real time sensor speed of the autonomous, semi-autonomous consumer vehicles and manually driven vehicles.

It shall be noted that the further description of the invention is written considering the segment as a road segment for the sake of brevity. However, it would be apparent for a person having ordinary skill in the art that the invention, based on the present disclosure, is also applicable for different segments such as railway tracks or air traffic lanes, without deviating from the scope of the invention. These and other technical improvements of the invention will become evident from the description provided herein.

FIG. 1 illustrates a schematic diagram of a network environment 100 of a system 101 for classifying at least one speed sign associated with a road segment, in accordance with an example embodiment. The system 101 may be communicatively coupled to a mapping platform 103 and a user equipment (UE) 105 associated with a vehicle 109 via a network 107. Further, the system 101 may also be communicatively coupled to other components such as an application 105a and a sensor 105b associated with the vehicle 109 via a network 107.

The system 101 may be embodied in one or more of several ways as per the required implementation. For example, the system 101 may be embodied as a cloud based service or a cloud based platform. As such, the system 101 may be configured to operate outside the user equipment 105. However, in some example embodiments, the system 101 may be embodied within the user equipment 105, for example as part of an in-vehicle navigation system. In each of such embodiments, the system 101 may be communicatively coupled to the components (for example the mapping platform 103 and the user equipment 105) shown in FIG. 1 to carry out the required operations.

The mapping platform 103 may comprise a map database 103a for storing map data and a processing server 103b. The map database 103a may store node data, road segment data, link data, point of interest (POI) data, link identification information, heading value records or the like. The map database 103a may also store cartographic data, routing data, and/or maneuvering data. According to some example embodiments, the road segment data records may be a collection of information of links or segments representing roads, streets, or paths, where the road segment data may be used for determining a route. Further, the node data may be end points corresponding to the respective links or segments of road segment data. The lower left node of the link is called as "reference node" and other node is called as "non-reference node". The map database 103a may also store information of link digitization. The link may be a single digitized link or a multi-digitized link. The link data and the node data may represent a road network, such as used by vehicles, cars, trucks, buses, motorcycles, and/or other entities. Optionally, the map database 103a may contain path segment and node data records, such as shape points or other data that may represent pedestrian paths, links or areas in addition to or instead of the vehicle road record data. The link data may represent a conditional link corresponding to the conditional road sign on the link. Further, the link data may also represent, but not limited to, conditional road sign, speed limit start sign, speed limit end sign, and the like.

The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a can include event data (e.g., traffic incidents, construction activities, scheduled events, unscheduled events, accidents, diversions etc.) associated with the POI data records or other records of the map database 103a.

In some embodiments, the map database 103a may additionally store data of different conditions for which restrictions (for example, but not limited to, speed limit restrictions) are valid on the road segment on which the vehicle is travelling. Various kinds of conditions can be distinguished based on, but not limited to, time and date, road conditions, vehicle property, vehicle usage, user group and purpose of access. For example, "time and date" may correspond to opening or closing hours of an institute (e.g., SCHOOL AHEAD 20 km/hr 07:00-02:00 PM). Further, "road conditions" may be associated with different recommended speeds with different road conditions due to conditions such as snow, fog, rain, and the like. Similarly, condition of "vehicle property" may correspond to condition related to width, weight, or height of the vehicle (e.g., WEIGHT <7.5). Similarly, "vehicle usage" restriction may depend upon how the vehicle is used such as the load or number of occupants.

In some embodiments, the map database 103a may be a master map database stored in a format that facilitates update, maintenance and development of the map database 103a. For example, the master map database or data in the master map database may be in an Oracle spatial format or other spatial format for development or production purposes. The Oracle spatial format or development/production database may be compiled into a delivery format (such as a geographic data files (GDF) format). The data in the production and/or delivery formats may be compiled to form geographic database products or databases, which may be used in end user navigation devices or systems.

For example, geographic data may be compiled in a format (such as a platform specification format (PSF)) to organize and/or configure the data for performing navigation-related functions and/or services, such as route calculation, route guidance, map display, speed calculation, distance and travel time functions, and other functions, by a navigation device, such as by user equipment 105. The navigation-related functions may correspond to vehicle navigation, pedestrian navigation or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some example embodiments, the map database 103a may be a master geographic database. Alternatively, the map database 103a may be a client-side map database or a compiled navigation database that may be used in or with the user equipment 105 to provide navigation and/or map-related functions. For example, the map database 103a may be used with the user equipment 105 to provide an end user with navigation features. In such a case, the map database 103a may be downloaded or stored on the user equipment 105.

The processing server 103b may comprise processing means and communication means. For example, the processing means may comprise one or more processors configured to process requests received from the user equipment 105. The processing means may fetch map data from the map database 103a and transmit the same to the user equipment 105 in a format suitable for use by the user equipment 105. In one or more example embodiments, the mapping platform 103 may periodically communicate with the user equipment 105 via the processing means 103b to update a local cache of the map data stored on the user equipment 105. Accordingly, in some example embodiments, the map data may also be stored on the user equipment 105 and may be updated based on periodic communication with the mapping platform 103.

The user equipment 105 may be any user accessible device such as a mobile phone, a smartphone, a portable computer, and the like that is portable in itself or as a part of another portable/mobile object such as a vehicle. In some example embodiments, user equipment 105 may be the vehicle itself. The user equipment 105 may comprise a processor, a memory and a communication interface. The processor, the memory and the communication interface may be communicatively coupled to each other. In some example embodiments, the user equipment 105 may be associated, coupled, or otherwise integrated with a vehicle (such as the vehicle 109), such as an advanced driver assistance system (ADAS), a personal navigation device (PND), a portable navigation device, an infotainment system and/or other device that may be configured to provide route guidance and navigation related functions. The vehicle 109 may be an autonomous semi-autonomous vehicle or a manually driven vehicle. In such example embodiments, the user equipment 105 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105. Additional, different, or fewer components may be provided. For example, the user equipment 105 may be configured to execute and run applications 105a such as a messaging application, a browser application, a navigation application, and the like. At least in some example embodiments, the user equipment 105 may be directly coupled to the system 101 via the network 107. As such, the user equipment 105 may be a dedicated vehicle (or a part thereof) for gathering data for development of the map data in the database 103a. In some alternate embodiments, the user equipment 105 may be accessible via an original equipment manufacturer (OEM) cloud. That is, instead of being directly connected to the network 107, the user equipment 105 may be connected to the OEM cloud which in turn may be connected to the network 107. In such example embodiments, the user equipment 105 may be a consumer vehicle (or a part thereof) and may be a beneficiary of the services provided by the system 101 and/or the mapping platform 103. Although a single user equipment 105 is shown in the example environment 100 of FIG. 1, it may however be contemplated that more than one user equipment may also be possible within the scope of this disclosure and therefore, the system 101 may be communicatively coupled to as many user equipment as may be required for a specific implementation. In some example embodiments, the user equipment 105 may serve the dual purpose of a data gatherer and a beneficiary device.

The user equipment 105 may be configured to capture sensor data associated with a road segment which the user equipment 105 may be traversing using one or more sensors 105b in the user equipment. The sensor data may for example be image data of road objects, road signs, or the surroundings (for example buildings, road objects, speed signs, and the like). In some example embodiments, the user equipment 105 may comprise acoustic sensors such as a microphone array, position sensors such as a GPS sensor, orientation sensors such as gyroscope, motion sensors such as accelerometer, a display enabled user interface such as a touch screen display, and other components as may be required for specific functionalities of the user equipment 105. In some embodiments, the system 101 may be implemented in the user equipment 105. Therefore, a local copy of map data is stored in the cache memory of user equipment 105.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

FIG. 2 illustrates a block diagram of the system 101 for classifying at least one speed sign associated with a road segment, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101, where the users may be a traveler, a rider, a pedestrian, and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101.

Additionally or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 105 or any other component with which the system 101 may communicate. The communication interface 205 may be any means such as a device or circuitry embodied in either hardware or a combination of hardware and software that is configured to receive and/or transmit data to/from a communications device in communication with the user equipment 105. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

FIG. 3 illustrates an exemplary scenario depicting a problem in classifying at least one speed sign associated with a road segment as a conditional sign, in accordance with an example embodiment. A problem exists in determining whether the speed limit sign should be considered as the conditional speed limit sign, in order to provide proper navigation. According to one example embodiment, a vehicle 303 may be traveling from L1 to L2 on a road segment 301, where the vehicle 303 may correspond to the vehicle 109 (hereinafter, the vehicle 303 is same as vehicle 109). The road segment 301 may be part of the way leading the vehicle 303 from a source location to a destination location. The road segment 301 may correspond to a conditional link with a link start location and link end location. The conditional link represents a link which is associated with the conditional speed limit sign in the map database. The road segment 301 may be referred as a conditional road if the conditional speed limit sign is associated with the road segment 301. One or more sensors (for example, the sensor 105b) of the vehicle 303 capture one or more speed limit signs associated with the road segment 301. However, sensor data provided by the sensor of the vehicle 303 may only comprise speed value mentioned in the speed limit sign and may not disclose whether the speed limit sign has any condition associated with the speed limit. Therefore, information 305c (hereinafter referred as "conditional speed limit data 305c") related to the presence of any conditional speed limit sign (for example speed sign 305a) on the road segment 301 may be obtained from the mapping platform 103, but the map data obtained from the mapping platform 103 may not be completely reliable as the map data is not updated in real-time.

It shall be noted that whether the road segment 301 includes the conditional speed limit sign 305a is determined by conditional speed limit data 305c associated with the conditional link associated with the road segment 301, which is pre-stored in the map database 103a. The road segment 301 includes a conditional speed sign 305a present at location (L2) near the link start location (L1) of the road segment 301 as shown in the FIG. 3, and the road segment 301 further includes a non-conditional speed limit sign 305b located at location (L3). The conditional speed limit sign 305a is a time-restricted condition sign.

In an example embodiment, the vehicle 303 may request, via the application 105a, for a route between the source location and the destination location from the mapping platform 103, where the conditional road 301 may be a part of the requested route. The information, indicating that the road segment 301 on which the vehicle is traversing corresponds to a conditional link, can be obtained from the mapping platform 103. Accordingly, the observed, via the one or more sensors of the vehicle 303, speed limit signs 305a and 305b are both considered as conditional speed limit signs and the speed limit value suggested to the user would be the conditional speed value i.e. 30 Km/hr, obtained from the mapping platform 103. However, out of the speed limit signs 305a and 305b, only the speed limit sign 305a is the conditional speed limit sign whereas 305b is a non-conditional speed limit sign. This indicates that the conditional speed limit is applicable only from the location (L2) to location (L3) of the speed limit sign 305b, and afterwards the speed limit value can be 50 Km/hr. However, this information is not provided by the existing systems and they incorrectly classify a non-conditional speed limit sign 305b as the conditional speed limit sign.

In an example embodiment, the one or more sensors associated with the vehicle 303 may observe the speed limit sign 305a on the road segment 301 in a real time and may report the vehicle 303 about the speed limit sign 305a as a conditional speed limit sign, while not providing information associated with the condition on the speed limit sign 305a associated with the conditional road 301. For example, the one or more sensor may report the vehicle 303 only about speed i.e. 30 km/hr as conditional speed associated with the conditional road 301 based on the observed speed limit sign 305a. However, the one or more sensors may not report the vehicle 303 about the condition i.e. 6:00 am-8:00 am associated with the conditional road 301. However, information indicating only the speed may not be sufficient to control the vehicle 303 with maximum safety. Also, lack of information regarding the condition associated with the conditional road 301 may result in hazardous situations.

To avoid above mentioned problems, the system 101 may use both sensor observations and conditions in the map data to determine the speed and the conditions associated with the conditional road 301 to classify speed limit sign associated with a road as a conditional or non-conditional speed signs such that an accurate navigation assistance system is achieved, which is explained further in detailed description of FIG. 4.

In some example embodiments, the system 101 may provide measures for properly classifying the speed limit sign as conditional speed limit sign and further obtaining map data of the conditional road 301 to determine the conditions associated with the conditional speed limit sign on the conditional road 301. For example, when the road segment 301 is determined to be a conditional road, the mapping platform 103 may trigger and invoke the system 101 for accurate classification of the speed limit signs as conditional or non-conditional speed sign and further provide the conditions associated with the conditional speed limit sign, which is explained further in detailed description of FIG. 4.

FIG. 4 illustrates a flow diagram of a method 400 for classifying speed limit sign as conditional or non-conditional speed signs, in accordance with an example embodiment. At step 401 of the method 400, the system 101 may obtain sensor data through one or more sensors of the vehicle 303. The sensor data may comprise speed limit data associated with a speed limit sign (for example the speed limit sign 305a or the speed limit sign 305b). The sensor data may be one of multiple sensor data or single sensor data. The single sensor data may correspond to information associated with only one speed limit sign. The multiple sensor data may correspond to information associated with two or more speed limit signs (for example two or more speed limit start signs or speed limit end signs) located within a distance threshold with each other on the same conditional road 301 or link.

In an example embodiment, in case of the multiple sensor data, the system 101 may select a speed limit start sign from the two or more speed limit start signs based on a speed limit value of the selected speed limit sign being greater than the speed limit values of remaining speed limit start signs of the two or more speed limit start signs. For example, if two speed limit start signs 80 km/hr and 60 km/hr are observed within 15 meters on the same conditional road by one or more sensors, and the vehicle 109 is a light-weighted vehicle such as cars, the system 100 selects 80 km/hr as the speed limit sign. It shall be noted that the consideration of selecting a speed limit start sign with greater speed value among the two or more speed limit start signs, is specifically for light-weighted vehicles such as cars, two-wheeler vehicles or three-wheeler vehicles because the speed limit values are generally higher for these light-weighted vehicles as compared to heavy-weighted vehicles. However, the system 101 can be modified without departing from the motivation of the invention to consider the case of heavy-weighted vehicles such as trucks, buses etc. In such a scenario, the system 101 may select a speed limit start sign from the two or more speed limit start signs based on a speed limit value of the selected speed limit sign being lower than the speed limit values of speed limit start signs of the two or more speed limit start signs. The different multiple sensor scenarios and single sensor scenarios are described further in FIGS. 5A-5C.

In an additional example embodiment, the one or more sensors in the vehicle 303 may observe a speed limit start sign and a speed limit end sign within a proximity distance threshold with each other on the same conditional road 301. In such a case, the system 101 may select the speed limit start sign as a speed limit sign and discard the speed limit end sign. In another additional example embodiment, the one or more sensors in the vehicle 303 may observe a speed limit start sign and an end of all restrictions sign within a proximity distance threshold with each other on the same conditional road 301. In such a case, the system 101 may select the end of all restrictions sign as a speed limit sign and discard the speed limit start sign. These scenarios related to end of all restrictions sign and speed limit end sign are described further in FIGS. 5D and 5E.

At step 403 of the method 400, the system 101 may obtain map data associated with the conditional road 301 from the map database 103*a*. The map database 103*a* may comprise for example, map data of the road segment 301 that the route may encompass in the region. The map data of the conditional road 301 may comprise information indicating whether the road segment 301 comprises a conditional speed limit sign 305*a*. In case the road segment 301 comprises a conditional speed limit sign 305*a*, the map data further comprises a conditional speed value limit associated with the conditional speed limit sign, one or more conditions associated with the conditional speed limit sign, a link start of the road segment 301, a link end of the road segment 301, a location of the conditional speed limit sign, and the like. The system 101 may select link start of the conditional road 301 (interchangeably referred as conditional link 301) as the location of the conditional limit speed sign. In an embodiment, if the conditional road 301 is single digitized, one of the reference node or non-reference node may be a location of the conditional speed limit sign. In another embodiment, if the conditional road is multi-digitized, both the reference node and the non-reference node may be the location of the conditional speed limit sign. Further, the map data may also comprise one or more conditions associated with the conditional speed value limit, where the one or more conditions may be distinguished based on, but not limited to, conditions on road, time and date, properties of the vehicle, vehicle usage, user group and the like.

At step 405 of the method 400, the system 101 may compare speed limit data obtained by one or more sensors of the vehicle 303 with the conditional speed limit data 305*c* in the map data to determine whether to classify the speed limit sign as conditional speed limit sign, based on the one or more conditions. The speed limit data comprises a speed limit value or a location of the speed limit sign as obtained by the one or more sensors. The conditional speed limit data 305*c* comprises a conditional speed limit value, a location of the conditional speed limit sign with respect to the road segment 301.

In an embodiment, the one or more conditions may include a first condition and a second condition. The first condition comprises whether difference in a location of the speed limit sign observed by the one or more sensors in the vehicle 303 and a location of the conditional speed limit sign in the map data is less than a threshold value. The second condition indicates whether the speed limit value of the speed limit sign is equal to the speed limit value of the conditional speed limit sign. At step 407 of the method 400, the system 101 may determine at least one of whether the difference in the location of the speed limit sign and the location of the conditional speed limit sign is less than a threshold value, or whether the speed limit value of the speed limit sign is equal to the speed limit value of the conditional speed limit sign. The system 101 may classify speed limit sign as the conditional speed limit sign, at step 409 of the method 400, if any of the first condition or the second condition is true. In case both conditions (i.e. the first condition and the second condition) are true, the precision of the data increases. In case both the conditions are false, the system 101 may classify speed limit sign as the non-conditional speed limit sign 411, at step 411 of the method 400. Further, the system 101 may generate classification data based on the classification of the speed limit sign. This is further explained in FIGS. 5A-5E.

As a result of the classification method 400 performed by the system 101, the problem associated with incorrect classification of the speed limit sign and lack of updated information in map database can be resolved. The system 101 provides accurate classification of speed limit sign as conditional or non-conditional may be used by the system 101 while providing navigation to the vehicle. Further, when the system 101 classifies the speed limit sign as the conditional speed limit sign or the non-conditional speed limit sign, the update in the classification of the speed limit sign is reflected in the map database 103*a* of the mapping platform 103 resulting in real-time updated map database 103*a*. Further, the map database 103*a* may also be updated with updated location of the at least one speed sign based on location information obtained by the one or more sensors.

FIGS. 5A-5E illustrates a schematic diagram showing different scenarios of one or more speed limit signs, in accordance with an example embodiment. FIGS. 5A-5E are described in conjunction with FIG. 4 and FIG. 3. The one or more sensors in the vehicle 303 traversing the conditional road 301 may capture sensor data associated with a single speed limit sign or multiple speed limit signs. Therefore, the sensor data may be single sensor data or multiple sensor data.

FIG. 5A illustrates an exemplary scenario 502 describing capturing and processing of single sensor data, in accordance with an example embodiment. In FIG. 5A, there is shown a conditional road 501 (for example, the conditional road 301) and a speed limit sign 503 (for example the speed limit sign 305a or 305b). In an example embodiment, the one or more sensors 105b in the vehicle 109 traversing the conditional road 501 may observe and report the speed limit sign 503 to the system 101 via the application 105a. In an example embodiment, the speed limit data captured by the one or more sensors 105b of the vehicle may comprise either the speed limit value (i.e. 30 km/hr) or the speed limit value along with a condition associated with the speed limit sign, i.e. 30 km/hr along with the associated time-bound condition. (6:00 am-12:00 pm). However, the condition obtained by the one or more sensor data for the speed limit sign 503 may not be accurate or clearly visible due to low coverage capability of the one or more sensors 105b of the vehicle 109. Therefore, the system 101 obtains the condition associated with the speed limit sign 503 from the map database 103a of the mapping platform 103. Further, the system 101 compares the speed limit data of the speed limit sign 503 with pre-stored conditional speed limit data 305c of the corresponding conditional speed limit sign in the map database 103a. If the comparison of the speed limit data and the conditional speed limit data 305c satisfies the first condition and the second condition (as described in FIG. 4 at step 407), then the speed limit sign is considered as the conditional speed limit sign, otherwise the speed limit sign is considered as a non-conditional speed limit sign.

For the case, when the speed limit sign is the conditional speed limit sign, the system 101 may render the conditional speed value along with condition, and the default speed value on the user equipment 105 via the application 105a. The default speed value is the value of speed which needs to be followed when the specified condition along with the speed limit sign does not exist, for example, timing falling out of the specific time condition (6:00 am-12:00 pm). Accordingly, for aforementioned possible scenarios the observed speed value by one or more sensors should correspond to 30 km/hr for condition 6:00-12:00 and 50 km/hr as default speed. For example, the autonomous or semi-autonomous vehicle traversing on the conditional road 501 should be informed about the default speed value i.e. 50 km/hr stored in the map database 103a, when vehicle 109 is traversing during a condition that is not in compliance with the condition 6:00-12:00 (for example 2 pm).

FIG. 5B illustrates an exemplary scenario 504 of capturing and processing of multiple sensor data, in accordance with an example embodiment. In FIG. 5B, there is shown a conditional road 501 (for example the conditional road 301), a first speed limit sign 505, and a second speed limit sign 507. In an example embodiment, the one or more sensors in the vehicle 109 traversing the conditional road 501 may observe and report multiple speed limit signs (i.e. the first speed limit sign 505 and the second speed limit sign 507) in different possible ways, where the first speed limit sign 505 indicates a speed value of 100 km/hr along with a time condition (6:00-12:00) and the second speed limit sign 507 indicates a speed value of 120 km/hr. Referring back to FIG. 4 at step 401, if more than one speed limit signs are within a distance threshold (for example, within 15 meters) of each other, then the system 101 may select speed limit sign with larger speed value as the speed limit sign for the linked conditional road 501. Accordingly, the system 101 may select the speed limit sign 507 indicating the speed value of 120 km/hr as the speed limit sign associated with the conditional road 501. However, in real-time there may be multiple scenarios in which the one or more sensors 105b of the vehicle 109 may capture the multiple sensor data.

For example, the one or more sensors 105b in the vehicle 109 may observe only one speed limit sign (i.e. the first speed limit sign 505 with speed limit value as 100 km/hr), neglecting or missing the second speed limit sign 507. Further, according to the second condition (described in the FIG. 4), if it is determined that the observed speed limit sign 100 km/hr is same as the map conditional speed, then the map speed i.e., 100 km/hr, is retained as the conditional map speed.

According to another example, the one or more sensors 105b in the vehicle 109 may observe only one speed limit sign (i.e. the second speed limit sign 507 with speed limit value as 120 km/hr), neglecting or missing the first speed limit sign 505. Further, according to the second condition (described in the FIG. 4), it is determined that the observed speed limit sign value 120 km/hr is not same as the map conditional speed i.e. 100 km/hr, and therefore speed 120 km/hr is used as the default value.

According to yet another example, the one or more sensors 105b in the vehicle 109 may observe both speed 100 km/hr and 120 km/hr without the time conditions. Based on the multiple sensor data scenario explained in step 401, the larger speed value sign 507 (120 km/hr) is considered and the speed value sign 505 (100 km/hr) is discarded. Further, according to the second condition (described in the FIG. 4), it is determined that the observed speed limit sign value 120 km/hr is not same as the map conditional speed i.e. 100 km/hr, therefore, 100 km/hr is considered as the conditional speed value and 120 km/hr is used as the default speed value.

According to yet another example scenario, the one or more sensors 105b in the vehicle 109 may observe 100 km/hr and 120 km/hr along with the time condition, and 120 km/hr speed value is considered based on the multiple sensors scenario condition according to FIG. 4, and the 100 km/hr speed value is used as conditional speed and 120 as a default speed based on the second condition explained in the FIG. 4 at steps 407, 409 and 411.

FIG. 5C illustrates an exemplary scenario 506 corresponding to a road segment 501 traversed by the vehicle 303 for describing classification of speed limit sign captured by the one or more sensors 105b as a conditional speed limit sign, in accordance with an example embodiment. As shown in FIG. 5C, the road segment 501 comprises a first speed limit sign 509a which is a conditional speed limit sign, and a second speed limit sign 509b which is a non-conditional speed limit sign. According to an example embodiment of the present invention, the road segment 501 is classified as conditional road in the map database 103a, because a conditional speed limit sign data 509c is associated with the road segment 501. The conditional speed limit sign data 509c corresponds to information related to the speed limit sign 509a. The conditional speed limit sign data 509c is pre-stored in the map database 103a Therefore, conditional speed limit data 509c is fetched from the map database 103a. The system 101, referring back to FIG. 4 at step 405, compares the speed limit data of each of the speed limit signs 509a and 509b with the conditional speed limit data 509c. The speed limit data of the speed limit signs 509a and 509b is obtained by one or more sensors of the vehicle 303. The system 101 determines the speed limit sign as the conditional speed limit sign, based on the comparison and one or more conditions such as the first condition and the second condition as described in description of FIG. 4.

For the classification of the first speed limit sign 509a as a conditional speed limit sign or a non-conditional speed limit sign, the system 101 obtains the location (L2) of the speed limit sign 509a and the location (L1) of the link start location which is considered as the location of the conditional speed limit sign. According to the first condition, explained in step 407 of the FIG. 4, the system 101 determines whether a difference in the location L2 and location L1 is less than a threshold distance (for example, 225 meters). Further, the system 101 compares, according to the second condition explained in the FIG. 4, a speed limit value (i.e. 30 km/hr) of the first speed limit sign 509a with the conditional speed limit value (i.e. 30 km/hr) obtained from the conditional speed limit sign data 509c. When both the first condition and the second condition are met, the speed limit sign is classified as the conditional speed limit sign.

For the classification of the second speed limit sign 509b as a conditional speed limit sign or a non-conditional speed limit sign, the system 101 obtains the location (L3) of the second speed limit sign 509b and the location (L1) of the conditional speed limit sign obtained from the conditional speed limit sign data 509c. The location (L1) of the conditional speed limit sign corresponds to a link start location of the link associated with the road segment 501. According to the first condition, explained in step 407 of the FIG. 4, the system 101 determines whether a difference in the location L3 and Location L1 is less than a threshold distance (for example, 225 meters), which means the distance (D1+D2) between the second speed limit 509b and the link start location is within the threshold distance. In the present scenario, the distance (D1+D2) is greater than the threshold distance. Further, the system 101 compares, according to the second condition explained in the FIG. 4, a speed limit value (i.e. 50 km/hr) of the second speed limit sign 509b with the conditional speed limit value (i.e. 30 km/hr) associated with the conditional road 501 obtained from the conditional speed limit sign data 509c. The system 101 determines that the speed limit value of the second speed limit sign 509b is different from the conditional speed limit value based on the comparison. Therefore, the second speed limit sign 509b is classified as non-conditional speed limit sign.

In another example embodiment, if the distance (D1+D2) is less than the threshold distance, and the speed limit value of the second speed limit sign 509b is different from the conditional speed limit value, then also the second speed limit sign 509b is classified as non-conditional speed limit sign. Further, in accordance with an example embodiment, if the speed limit value of the second speed limit sign 509b is equal to the conditional speed limit value, and the distance (D1+D2) is greater than the threshold distance, then also the second speed limit sign 509b is classified as non-conditional speed limit sign.

In an example embodiment, the system 101 is further configured to select an end of all restriction sign when it lies in proximity with a speed limit start sign. The system 101 is further configured to discard a speed limit associated with a speed limit end sign and select speed associated with a speed limit start sign which is present in proximity of the speed limit end sign. The above mentioned scenarios are discussed in details in FIGS. 5D and 5E.

FIG. 5D illustrates an exemplary scenario 508 of capturing and processing of end of all restrictions sign present in proximity with a speed limit start sign, in accordance with an example embodiment. In FIG. 5D, there is shown a conditional road 501 (for example the conditional road 301), a speed limit start sign 511, and an all restriction end sign 513. In an example embodiment, the one or more sensors in the vehicle 109 traversing the conditional road 501 may observe and report multiple speed limit signs (i.e. the speed limit start sign 511 and the all restriction end sign 513), where the speed limit sign 511 indicates a speed value of 100 km/hr along with a time condition (6:00-12:00) and the all restriction end sign 513 indicates that all restrictions associated with the conditional road 501 end here. All restrictions may include "end of previous limitations", or "end of speed limit and overtaking restrictions". If speed limit start sign 511 and all restriction end sign 513 are within a proximity distance threshold, then the system 101 may select the all restriction end sign 513 and discard the speed limit start sign 511 for the linked conditional road 501. Accordingly, the system 101 may select speed associated with the all restriction end sign 513 indicating end to all restrictions associated with the conditional road 501 and discard the speed limit start sign 511. The speed associated with the all restriction end sign 513 may be the default speed associated with the conditional road 501.

FIG. 5E illustrates an exemplary scenario 510 of capturing and processing of a speed limit end sign present in proximity with a speed limit start sign, in accordance with an example embodiment. In FIG. 5E, there is shown a conditional road 501 (for example the conditional road 301), a speed limit start sign 515, and a speed limit end sign 517. In an example embodiment, the one or more sensors in the vehicle 109 traversing the conditional road 501 may observe and report multiple speed limit signs (i.e. the speed limit start sign 515 and the speed limit end sign 517), where the speed limit start sign 515 indicates a speed value of 100 km/hr without any time condition and the speed limit end sign 517 indicates end of restricted speed limit 80 km/hr associated with the conditional road 501. In this case, the system 101 may select the speed value (i.e. 100 km/hr) associated with the speed limit start sign 515 as default speed for the linked conditional road 501, and discard the restricted speed (80 km/hr) associated with the speed limit end sign 517.

FIG. 6 illustrates a flow diagram of a method 600 for classifying at least one speed sign associated with a segment of region, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. It shall be noted that the segment may comprise a road segment, a railway track segment, a virtual air traffic lane segment or the like.

At step 601, the method comprises obtaining sensor data comprising speed limit data associated with the at least one speed sign. The system 101 may obtain the sensor data from one or more sensors associated with a vehicle (e.g., the vehicle 109) traversing the segment, as described in description of FIG. 1. Further, the speed limit data comprises a speed limit value that is the speed value of the speed limit sign associated with the segment on which the vehicle is traversing. In a non-limiting example embodiment, the vehicle may comprise land vehicles such as cars, trucks, trains etc., air vehicles such as drone, airplanes, etc., or water vehicles such as motorboats, ships, etc.

At step 603, the method comprises obtaining map data associated with the segment. The road segment may be conditional or non-conditional road. The map data obtained from map database 103a comprises conditional speed limit data associated with a conditional speed limit sign linked with the segment. The conditional speed limit sign comprises a conditional speed value limit, and a condition for which the conditional speed value limit is applicable. In an example embodiment, the map database may comprise information related to different paths possibly traversed by the respective vehicle, for example railway tracks for trains, road segments for cars, or air traffic lanes for drones. Further, the map database may also comprise conditional speed limit data associated with each path, for example, conditional diverging paths for trains with respective conditional speed for each path, conditional speed limit associated with road segment, or the like.

At step 605, the method comprises comparing the speed limit data obtained from one or more sensors associated with a vehicle (e.g., the vehicle 109) with the conditional speed limit data in the map database 103a. At step 607, the method comprises classifying the at least one speed sign as one of a conditional speed sign or a non-conditional speed sign based on the comparison. Based on the classification of the at least one speed sign, the map database 103a is updated to incorporate real-time information related to the updated classification of the at least one speed sign. Further, the map database 103a may also be updated with current location of the at least one speed sign based on location information obtained by the one or more sensors.

The method 600 may be implemented using corresponding circuitry. For example, the method 600 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise a processor (e.g. the processor 201) configured to perform some or each of the operations of the method of FIG. 6 described previously. The processor may, for example, be configured to perform the operations (601-607) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-607) may comprise, for example, the processor 201 which may be implemented in the system 100 and/or a device or circuit for executing instructions or executing an algorithm for processing information as described above.

In this way, example embodiments of the invention result in classifying the speed sign associated with the segment as conditional speed sign or non-conditional speed sign. In many situations, the data associated with conditional signs in the map data is not updated and the speed signs observed by the sensor fail to provide complete information about the conditional speed limit sign. In such situations, the system and method according to the present invention fuse the sensor observed data with the data stored in the map-data to gather the complete and accurate information of such conditional roads.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for classifying at least one speed sign associated with a region, the system comprising:
 a memory configured to store computer executable instructions; and
 one or more processors configured to execute the instructions to:
  obtain sensor data comprising speed limit data associated with the at least one speed sign;
  obtain map data associated with a segment of the region, wherein the map data comprises conditional speed limit data associated with a conditional speed limit sign linked with the segment;

compare the speed limit data with the conditional speed limit data; and classify the at least one speed sign as one of a conditional speed sign or a nonconditional speed sign based on the comparison, wherein the sensor data comprising a plurality of speed signs within a proximity distance threshold, classify a speed sign with maximum speed value or minimum speed value among the plurality of speed signs as the conditional speed sign or a nonconditional speed sign.

2. The system of claim 1, wherein the sensor data is obtained from one or more sensors associated with a vehicle traversing the segment.

3. The system of claim 1, wherein the one or more processors are further configured to update the map data associated with the segment based on the classification of the at least one speed sign.

4. A system for classifying at least one speed sign associated with a region, the system comprising:
a memory configured to store computer executable instructions; and
one or more processors configured to execute the instructions to:
obtain sensor data comprising an end of all restriction sign and a speed limit start sign within a proximity distance threshold;
select the end of all restriction sign; and
discard the speed limit start sign.

5. A system for classifying at least one speed sign associated with a region, the system comprising:
a memory configured to store computer executable instructions; and
one or more processors configured to execute the instructions to:
obtain sensor data comprising a speed limit end sign and a speed limit start sign within a proximity distance threshold;
select the speed limit start sign; and
discard the speed limit end sign.

6. The system of claim 1, wherein the conditional speed limit sign comprises a conditional speed value limit, and a condition for which the conditional speed value limit is applicable.

7. The system of claim 1, wherein the at least one speed sign is classified as the conditional speed sign based on at least one of:
a difference in a location of the at least one speed sign and a location of the conditional speed limit sign is less than a threshold value; or
a speed value of the at least one speed sign is equal to a speed value of the conditional speed limit sign.

8. The system of claim 7, wherein the location of the conditional speed limit sign corresponds to a link start location of a link associated with the segment.

9. A method for classifying at least one speed sign associated with a region, the method comprising:
obtaining sensor data comprising speed limit data associated with the at least one speed sign;
obtaining map data associated with a segment of the region, wherein the map data comprises conditional speed limit data associated with a conditional speed limit sign linked with the segment;
comparing the speed limit data with the conditional speed limit data; and
classifying the at least one speed sign as one of a conditional speed sign or a nonconditional speed sign based on the comparison,
wherein the sensor data comprising a plurality of speed signs within a proximity distance threshold, classifying a speed sign with maximum speed value or minimum speed value among the plurality of speed signs as the conditional speed sign or a nonconditional speed sign.

10. The method of claim 9, further comprising updating the map data associated with the segment based on the classification of the at least one speed sign, wherein the sensor data is obtained from one or more sensors associated with a vehicle traversing the segment.

11. A method for classifying at least one speed sign associated with a region, the method comprising:
obtaining sensor data comprising an end of all restriction sign and a speed limit start sign within a proximity distance threshold;
selecting the end of all restriction sign; and
discarding the speed limit start sign.

12. A method for classifying at least one speed sign associated with a region, the method comprising:
obtaining sensor data comprising a speed limit end sign and a speed limit start sign within a proximity distance threshold;
selecting the speed limit start sign; and
discarding the speed limit end sign.

13. The method of claim 9, wherein the conditional speed limit sign comprises a conditional speed value limit, and a condition for which the conditional speed value limit is applicable.

14. The method of claim 9, wherein the at least one speed sign is classified as the conditional speed sign based on at least one of:
a difference in a location of the at least one speed sign and a location of the conditional speed limit sign is less than a threshold value; or
a speed value of the at least one speed sign is equal to a speed value of the conditional speed limit sign.

15. The method of claim 14, wherein the location of the conditional speed limit sign corresponds to a link start location of a link associated with the segment.

16. A computer programmable product comprising a non-transitory computer readable medium having stored thereon computer executable instruction which when executed by one or more processors, cause the one or more processors to carry out operations for classifying at least one speed sign associated with a region, the operations comprising:
obtaining sensor data comprising speed limit data associated with the at least one speed sign;
obtaining map data associated with a segment of the region, wherein the map data comprises conditional speed limit data associated with a conditional speed limit sign linked with the segment;
comparing the speed limit data with the conditional speed limit data; and
classifying the at least one speed sign as one of a conditional speed sign or a nonconditional speed sign based on the comparison,
wherein the sensor data comprising a plurality of speed signs within a proximity distance threshold, classifying a speed sign with maximum speed value or minimum speed value among the plurality of speed signs as the conditional speed sign or a nonconditional speed sign.

* * * * *